United States Patent
Li et al.

(10) Patent No.: US 12,046,153 B2
(45) Date of Patent: Jul. 23, 2024

(54) DEVICE AND METHOD FOR SIMULATING LAYERED STRATUM CONTAINING NATURAL GAS HYDRATES

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Zhaoyang Chen, Guangzhou (CN); Yi Wang, Guangzhou (CN); Zhiming Xia, Guangzhou (CN); Gang Li, Guangzhou (CN); Yu Zhang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 852 days.

(21) Appl. No.: 17/255,991

(22) PCT Filed: Sep. 8, 2020

(86) PCT No.: PCT/CN2020/114094
§ 371 (c)(1),
(2) Date: Dec. 23, 2020

(87) PCT Pub. No.: WO2021/159698
PCT Pub. Date: Aug. 19, 2021

(65) Prior Publication Data
US 2022/0301457 A1    Sep. 22, 2022

(30) Foreign Application Priority Data

Aug. 6, 2020  (CN) .................. 202010784517.X (51) Int. Cl.
*G09B 23/40* (2006.01)

(52) U.S. Cl.
CPC .................................. *G09B 23/40* (2013.01)

(58) Field of Classification Search
CPC ............................. G09B 23/40; E21B 49/00
See application file for complete search history.

(56) References Cited

U.S. PATENT DOCUMENTS

5,659,135 A * 8/1997 Cacas .................... G09B 23/40
                                                         73/152.52
9,790,743 B2 * 10/2017 Li ........................... E21B 34/00
(Continued)

*Primary Examiner* — Kurt Fernstrom
(74) *Attorney, Agent, or Firm* — Bayramoglu Law Offices LLC (57) ABSTRACT

A device and a method for simulating layered stratum containing natural gas hydrates are provided. The device includes a reactor; wherein the reactor includes an upper cover, a lower cover, and a reactor body, wherein the upper cover and the lower cover are sealably attached to two ends of the reactor body to form a closed chamber; an overlying pressure layer, a superstratum layer, a hydrate layer and a substratum layer are sequentially formed throughout inside of the closed chamber from the upper cover to the lower cover, wherein each layer is respectively filled with different kinds of porous media and fluids and the each layer is provided with a stratal-fluid annular container; each stratal-fluid annular container has an outer periphery contacting an inner surface of the reactor body. The method is conducted using the device.

10 Claims, 4 Drawing Sheets

(56) References Cited

U.S. PATENT DOCUMENTS

| | | | | |
|---|---|---|---|---|
| 11,175,434 B2* | 11/2021 | Laverne | ................. | G01V 20/00 |
| 11,946,345 B2* | 4/2024 | Li | ........................... | G09B 23/40 |
| 2010/0006287 A1* | 1/2010 | Schicks | ................ | E21B 43/295 |
| | | | | 166/272.1 |
| 2011/0290488 A1* | 12/2011 | Boone | .................... | E21B 43/16 |
| | | | | 166/300 |

* cited by examiner

DEVICE AND METHOD FOR SIMULATING LAYERED STRATUM CONTAINING NATURAL GAS HYDRATES

CROSS REFERENCE TO THE RELATED APPLICATIONS

This application is the national stage entry of International Application No. PCT/CN2020/114094, filed on Sep. 8, 2020, which is based upon and claims priority to Chinese Patent Application No. 202010784517.X, filed on Aug. 6, 2020, the entire contents of which are incorporated herein by reference.

TECHNICAL FIELD

The present invention relates to the technical field of natural gas hydrate simulation experiments, and particularly relates to a device and a method for simulating layered stratum containing natural gas hydrates.

BACKGROUND

Natural gas hydrates (NGH; also known as flammable ice) are white ice-like crystals formed by the combination of water molecules and gas molecules such as light hydrocarbons, $CO_2$ and $H_2S$ under low temperature and high pressure. They are non-stoichiometric clathrate. Natural gas hydrates can be found all over the world with huge reserves, and have been considered to be a superior and clean energy source in the future, as they hold twice the total carbon in the conventional fossil fuel reserves (petroleum, natural gas, and coal), making them the most important energy resource in the $21^{st}$ century. With the increasing demand on energy which cannot be met by the highly-polluting conventional fossil fuels such as coal and petroleum, natural gas as a potential substitute has increased its proportion in global energy structure.

With more samples collected from deeper regions, the understanding on formation environment for hydrate reservoirs has become clearer, which imposes new challenges to the experimental simulation devices. Huge pressure and low ambient temperature are necessary for the formation of natural gas hydrates, and thus higher requirements are raised on the experimental simulation systems for producing such conditions. How to accurately regulate the simulation environment, how to ensure the normal operation of each experimental device under severe conditions, and how to ensure the high structural reliability of the experimental devices under such conditions, have been of great consideration for the design and development of experimental systems. There are no existing experimental devices that enable layered structure of stratum inside the reactor or simulation of stratal fluids.

SUMMARY

In view of the defects of the prior art, one object of the present invention is to provide a device and a method for simulating layered stratum containing natural gas hydrates, which enable the study on the layered distribution of hydrates in the reservoirs and the replenishing amounts of stratal fluids in various layers.

In order to realize the above object, the technical solution of the present invention involves: A device for simulating layered stratum containing natural gas hydrates, comprises a reactor; the reactor comprises an upper cover, a lower cover, and a reactor body, wherein the upper cover and the lower cover are sealably attached to two ends of the reactor body to form a closed chamber; a temperature gradient simulator is disposed inside the reactor; an overlying pressure layer, a superstratum layer, a hydrate layer and a substratum layer are sequentially formed throughout inside of the chamber from the upper cover to the lower cover, wherein each layer is respectively filled with different kinds of porous media and fluids and provided with a stratal-fluid annular container; each stratal-fluid annular container has an outer periphery contacting an inner surface of the reactor body, and an inner periphery contacting the filling substances of each layer through a porous plate; each stratal-fluid annular container is communicated with a fluid replenishing module respectively, wherein the stratal-fluid annular container of the overlying pressure layer is communicated with a overlying pressure layer fluid replenishing module, the stratal-fluid annular container of the superstratum layer is communicated with a superstratum layer fluid replenishing module, the stratal-fluid annular container of the hydrate layer is communicated with a hydrate layer fluid replenishing module, and the stratal-fluid annular container of the substratum layer is communicated with a substratum layer fluid replenishing module; the reactor is provided with a gas inlet for introducing methane gas into the chamber and a fluid inlet for introducing fluid into the chamber; a central exploitation wellbore penetrating a center of the reactor is disposed from the upper cover to the lower cover.

The device as described above is further featured in that each fluid replenishing module comprises a replenishing stratal fluid container, a fluid replenishing constant-flow pump, and a pipeline pressure sensor, wherein the replenishing stratal fluid container is communicated with the stratal-fluid annular container through a pipeline provide with a detachable joint and a stratal fluid replenishing valve; the pipeline pressure sensor is configured to turn on the fluid replenishing constant-flow pump when a pressure inside the stratal-fluid annular container is lower than a predetermined value, and turn off the fluid replenishing constant-flow pump when the pressure inside the stratal-fluid annular container reaches the predetermined value.

The device as described above is further featured in that, each replenishing stratal fluid container is filled with a stratal fluid, provided with a cover, and placed on a weighing machine.

The device as described above is further featured in that, a scale is provided inside the reactor along a height direction of the reactor, and the scale is configured to measure a thickness of each layer.

The device as described above is further featured in that, the temperature gradient simulator comprises an upper circulation coil and a lower circulation coil; wherein the upper circulation coil and the lower circulation coil are respectively disposed at an upper end and a lower end inside the reactor body; the upper circulation coil and the lower circulation coil are respectively provided with an independent heat exchange device to realize circulation of a heat transfer medium in the coil; temperature control pipes are spacedly provided, with an amount of N, inside the reactor body and between the upper circulation coil and the lower circulation coil, configured to form a vertical temperature gradient in the reactor body, wherein N is a positive integer; each temperature control pipe is also provided with an independent heat exchange device to realize the circulation of the heat transfer medium in the temperature control pipe.

The device as described above is further featured in that, the N temperature control pipes are equally spaced from bottom to top and a constant temperature difference is given between the temperature control pipes, wherein the temperature difference is expressed as:

$\Delta T=(T1-T2)/(N+1)$, wherein T2 represents a temperature of the lower circulation coil, and T1 represents a temperature of the upper circulation coil.

The device as described above is further featured in that, temperature sensors are provided inside the reactor body and configured to monitor the temperatures of the upper circulation coil, the lower circulation coil and the N temperature control pipes and transmit the monitored temperature data to a regulator; the regulator is configured to regulate in real time the operation of each heat exchange device according to the monitored temperature data, so as to maintain the vertical temperature gradient in the reactor body stable.

A method for simulating layered stratum containing natural gas hydrates by using the above-mentioned device, comprises the following steps:

filling the reactor with the porous media and introducing methane gas and the fluids into the rector according to required compositions of the superstratum layer, the hydrate layer and the substratum layer, reserving a space for the overlying pressure layer, and then sealing the reactor;

checking a gas tightness of the reactor;

reducing a temperature inside the reactor to a simulated stratal temperature;

setting a predetermined value for turning on each fluid replenishing constant-flow pump, wherein the predetermined value for the overlying pressure layer is set to a value that simulates a overlying pressure at seafloor;

monitoring a pressure inside the reactor; when the pressure inside the reactor is stable, conducting a simulation of a natural gas hydrate exploitation process by the depressurized method or thermal stimulation method, during which a water-gas-sand mixture is continuously produced from the central exploitation wellbore and thereby the pressure at each layer in the reactor reduces; when the pressure at one layer is lower than the predetermined value, turning on the fluid replenishing constant-flow pump to replenish the stratal-fluid annular container with the stratal fluid which then flows to the layer through the porous plate, and when the pressure at the layer reaches the predetermined value, turning off the fluid replenishing constant-flow pump;

recording a mass change of each stratal fluid during the process to obtain an replenishing amount of the stratal fluid.

Compared with the prior art, the present invention has the following beneficial effects:

(1) The device enables simulation of layered stratum by filling the reactor with various media, and specifically by using porous media of various properties to construct a superstratum layer, a hydrate layer and a substratum layer which are different in stratal properties. By altering the porous media, it is possible to construct permeable/impermeable layers and sandy/silty/muddy hydrate layers, thereby reproducing actual stratal conditions of hydrate reservoirs in a scale model.

(2) Layered stratum construction of hydrate reservoirs is realized in the reactor. Inside of the reactor is dividing into four layers, wherein the temperatures of the superstratum layer and the substratum layer are regulated separately and accurately, so as to provide a layered stratum structure of NGH reservoirs including the superstratum layer, the hydrate layer and the substratum layer. Measurements inside the reactor are also conducted layer by layer.

(3) Each layer is provided with a fluid replenishing container and a fluid replenishing module, which maintain the pressure and fluid unchanged in each layer during the simulation of natural gas hydrate exploitation process. The fluid replenishing module monitors the pressure through a pressure sensor, which allows monitoring fluid loss and replenishing the fluid in real-time according to the pressure during the simulation. Deformation of the superstratum layer during the simulation also provides experimental evidences for the study on sand prevention and stratum instability.

(4) The temperature gradient simulator realizes stable heating by providing the upper circulation coil and the lower circulation coil at the upper and lower ends inside the reactor body. N temperature control pipes are spacedly provided between the upper circulation coil and the lower circulation coil and encircling the reactor body; moreover, each temperature control pipe is also provided with an independent heat exchange device to realize the circulation of the heat transfer medium in the temperature control pipe (i.e., they are also capable of cooling, heating, and maintaining temperature), such that the temperature of each temperature control pipe can be regulated independently, realizing the simulation of formation temperature gradient inside the reactor body. The combination of the temperature gradient simulator and the stratal-fluid annular container can realize the simulation of stratum environment with high accuracy and higher efficiency, and also make the stratal fluid replenishing process more accurate, resulting in a more accurate measurement of a replenishing amount of the stratal fluid.

Reference signs: 1—central exploitation wellbore; 2—array wellbore; 3—stratal-fluid annular container of the superstratum layer; 4—superstratum layer; 5—boundary between the superstratum layer and the hydrate layer; 6—stratal-fluid annular container of the hydrate layer; 7—hydrate layer; 8—boundary between the hydrate layer and the substratum layer; 9—substratum layer; 10—stratal-fluid annular container of the substratum layer; 11—reactor body; 12—fluid inlet; 13—gas inlet; 14—lower cover; 15—substratum layer fluid replenishing module; 16—hydrate layer fluid replenishing module; 17—superstratum layer fluid replenishing module; 18—overlying pressure layer fluid replenishing module; 19—overlying pressure layer; 20—upper cover; 21—stratal-fluid annular container of the overlying pressure layer; 22—pipeline interface; 23—stratal-fluid annular container; 24—detachable joint; 25—pipeline pressure sensor; 26—fluid replenishing constant-flow pump; 27—weighing machine; 28—stratal fluid; 29—replenishing stratal fluid container; 30—cover of the replenishing stratal fluid container; 31—stratal fluid replenishing valve; 32—porous plate;

200—reactor body; 201—upper cover; 202—lower cover; 203—upper circulation coil; 204—lower circulation coil; 205—temperature control pipe; 206—bolt;

301—central vertical well outlet pipeline; 302—central vertical well pressure sensor; 303—central vertical well outlet valve; 304—communicating vessel; 305—non-central vertical well outlet pipeline; 306—non-central vertical well pressure sensor; 307—non-central vertical well outlet valve; 308—differential pressure sensor; 309—communicating vessel valve; 310—communicating vessel pressure sensor; 311—gas injection valve.

DETAILED DESCRIPTION OF THE EMBODIMENTS

The present invention will be further described in detail below with the accompanying drawings and specific embodiments.

Figure 1:
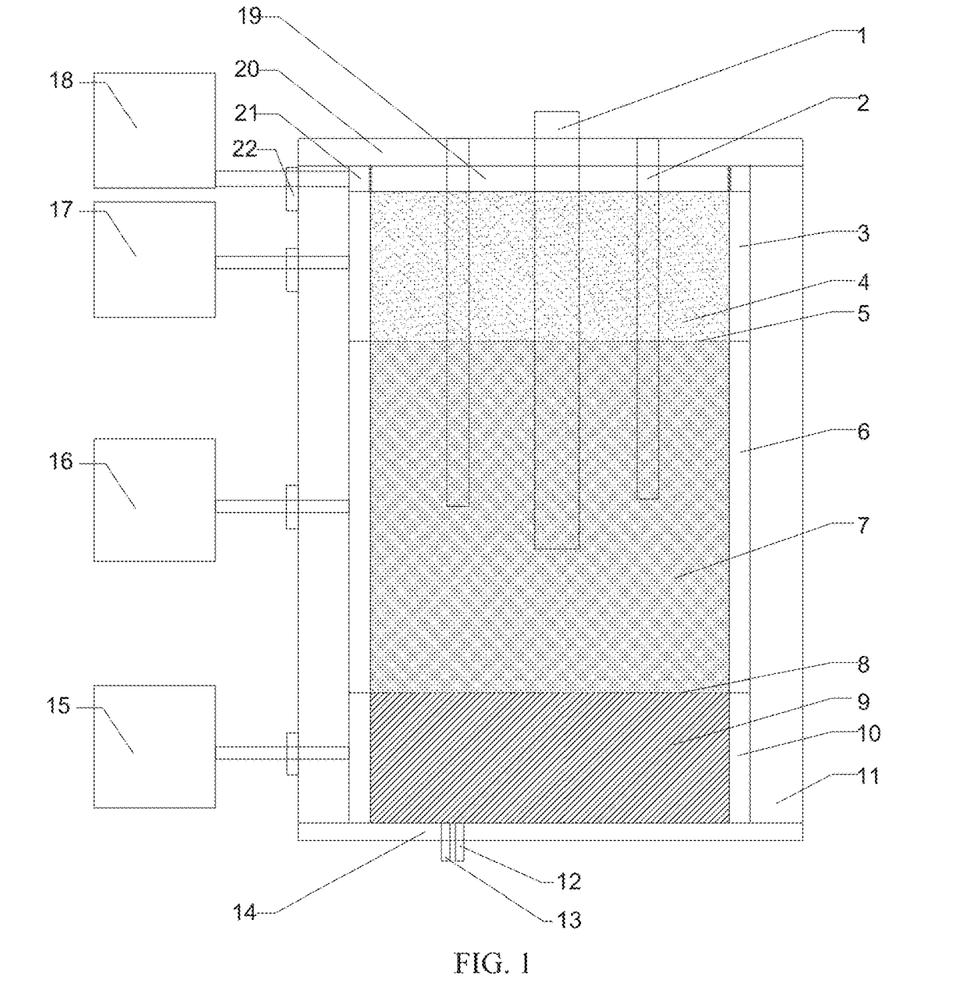
FIG. 1 shows the structure of a device of the present invention.
Figure 2:
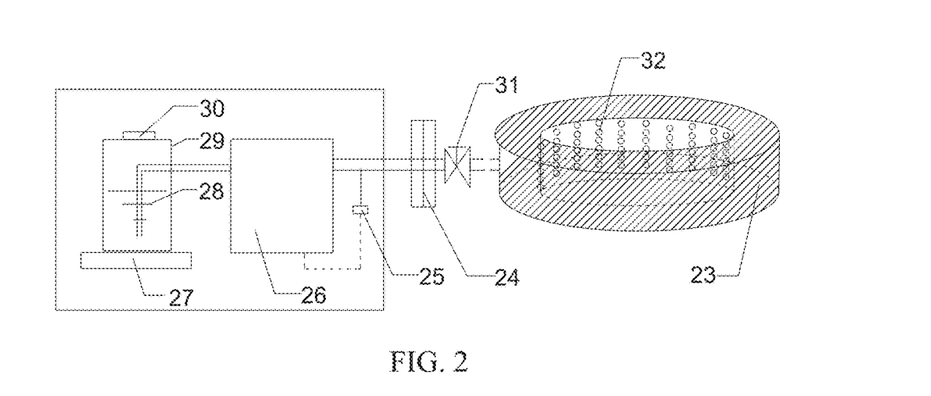
FIG. 2 shows the structure of a fluid replenishing module of the present invention.

As shown in FIG. 1 and FIG. 2, the device comprises a reactor, wherein temperature regulation of the reactor is realized by disposing the reactor in a constant-temperature water bath or via a temperature gradient simulator. The reactor comprises an upper cover 20, a lower cover 14, and a reactor body 11. The upper cover 20 and the lower cover 14 are sealably attached to two ends of the reactor body to form a closed chamber. A central exploitation wellbore 1 and a plurality of array wellbores 2 are disposed in the reactor, wherein the central exploitation wellbore 1 penetrates the reactor along its axis (however, in FIG. 1 the central exploitation wellbore 1 does not penetrate the reactor; whether the central exploitation wellbore 1 penetrates the reactor depends on actual needs), while the array wellbores 2 were inserted into the layers from the upper cover 20. Inside of the reactor was divided into four stratal layers: an overlying pressure layer 19, a superstratum layer 4, a hydrate layer 7 and a substratum layer 9, wherein each layer is respectively filled with different kinds of porous media and/or fluids. Each layer is respectively provide with a stratal-fluid annular container 23 encompassing the layer, including a stratal-fluid annular container 21 of the overlying pressure layer 19, a stratal-fluid annular container 3 of the superstratum layer 4, a stratal-fluid annular container 6 of the hydrate layer 7, and a stratal-fluid annular container 10 of the substratum layer 9. A scale (not shown in the drawings) is provided on the inner wall of the reactor; the scale allows measuring a thickness of each layer, and recording a boundary 5 between the superstratum layer and the hydrate layer and a boundary 8 between the hydrate layer and the substratum layer. A fluid inlet 12 and a gas inlet 13 are provided at the lower cover 14. The stratal fluid in the stratal-fluid annular container 10 of the substratum layer will be replenished from the substratum layer fluid replenishing module 15, and flow into the substratum layer 9 to maintain the pressure and fluid unchanged. The stratal fluid in the stratal-fluid annular container 6 of the hydrate layer will be replenished from the hydrate layer fluid replenishing module 16, and flow into the hydrate layer 7 to maintain the pressure and fluid unchanged. The stratal fluid in the stratal-fluid annular container 3 of the superstratum layer will be replenished from the superstratum layer fluid replenishing module 17, and flow into the superstratum layer 4 to maintain the pressure and fluid unchanged. The stratal fluid in the stratal-fluid annular container 21 of the overlying pressure layer will be replenished from the overlying pressure layer fluid replenishing module 18, and flow into the overlying pressure layer 19 to maintain the pressure and fluid unchanged. The four fluid replenishing modules are identical in components, but filled with different stratal fluids 28, respectively a substratum layer stratal fluid, a hydrate layer stratal fluid, a superstratum layer stratal fluid, and an overlying pressure layer stratal fluid. In one fluid replenishing module, a stratal fluid 28 is added into the replenishing stratal fluid container 29 when the cover 30 is opened, wherein an amount of the added fluid is measured using a weighing machine 27; the pressure of each layer, which is transferred through a pipeline interface 22, a stratal fluid replenishing valve 31, and a detachable joint 24, will be monitored by a pipeline pressure sensor 25; when the pressure is lower than a predetermined value, a fluid replenishing constant-flow pump 26 will be turned on such that the stratal fluid will be introduced to the stratal-fluid container and then flow to the layer through a porous plate 32; when the pressure reaches the predetermined value, the fluid replenishing constant-flow pump 26 will be turned off.

Operation principle of the device:

The layers are respectively filled with different porous media. Before formation of hydrates is complete, the stratal fluid replenishing valves 31 of the four layers are closed. Gas and fluid are introduced to form natural gas hydrates. When the simulated formation of hydrates inside the reactor is stable and ready for exploitation simulation, replenishment of the stratal fluids is initiated. The stratal fluids in different layers may be saline solutions with a same composition or with different compositions, depending on the simulated conditions or experimental design. The porous plates 32 are configured to prevent sands in the layers from entering the fluid replenishing modules and affecting the fluid replenishing process. The device enables simulation of layered stratum by filling the reactor with various media. Each layer is provided with a fluid replenishing container and a fluid replenishing module, which maintain the pressure and fluid unchanged in each layer during the simulation of natural gas hydrate exploitation process. The fluid replenishing module monitors the pressure through a pressure sensor, which allows monitoring fluid loss and replenishing the fluid in real-time according to the pressure during the simulation.

A method for simulating layered stratum containing natural gas hydrates by using the above-mentioned device, comprises the following steps:

filling the reactor with the porous media and introducing methane gas and the fluids into the rector according to required compositions of the superstratum layer, the hydrate layer and the substratum layer, reserving a space for the overlying pressure layer, and then sealing the reactor;

checking a gas tightness of the reactor;

reducing a temperature inside the reactor to a simulated stratal temperature;

setting a predetermined value for turning on each fluid replenishing constant-flow pump, wherein the predetermined value for the overlying pressure layer is set to a value that simulates a overlying pressure at seafloor;

monitoring a pressure inside the reactor; when the pressure inside the reactor is stable, conducting a simulation of a natural gas hydrate exploitation process by the depressurized method or thermal stimulation method, during which a water-gas-sand mixture is continuously produced from the central exploitation wellbore and thereby the pressure at each layer in the reactor reduces; when the pressure at each layer is lower than the predetermined value, turning on the fluid replenishing constant-flow pump to replenish the stratal-fluid annular container with the stratal fluid which then flows to each layer through the porous plate; when the pressure at each layer reaches the predetermined value, turning off the fluid replenishing constant-flow pump;

recording a mass change of each stratal fluid during the process to obtain an replenishing amount of the stratal fluid.

In one embodiment, the method are specifically performed as follows:

(1) Constructing Layered Stratum:

The upper cover of the reactor is opened; then the reactor is filled with a substratum layer medium, a hydrate layer medium, and a superstratum layer medium, with a specific thickness respectively, according to the scale on the inner wall of the reactor, while a space is reserved for the overlying pressure layer, and .thereby the reactor is sealed. Before formation of hydrates is complete, the stratal fluid replenishing valves of the four layers are closed. Methane gas is introduced through the gas inlet, and simulated sea water or water is introduced through the fluid inlet. Gas tightness of the reactor is inspected through monitoring the pressure, wherein it will be determined to be gas tight when the pressure stays unchanged for a period of time.

(2) Simulation of Formation of Natural Gas Hydrates

The temperature inside the reactor is reduced to a simulated stratal temperature, such that the pressure in the reactor will slowly decrease until it reaches an unchanged value. When the temperature and pressure are stable, it is ready for the next step.

(3) Simulation of Exploitation of Natural Gas Hydrates

The stratal fluids of the four layers are respectively added into the corresponding replenishing stratal fluid containers, and the stratal fluid replenishing valves of the four fluid replenishing modules are opened. The pressure of each layer is monitored, and the predetermined value of each constant flow pump is set, wherein the predetermined value for the overlying pressure layer is set to a value that simulates a overlying pressure at seafloor. When the pressure is stable, it is ready for the next step.

(4) Regulation of the Stratal Fluids

A simulation of a natural gas hydrate exploitation process by the depressurized method or thermal stimulation method is conducted. During the process, a water-gas-sand mixture is continuously produced from the central exploitation wellbore and thereby the pressure at each layer in the reactor reduces. When the pressure at one layer is lower than the corresponding predetermined value, the corresponding fluid replenishing constant-flow pump will be turned on to replenish the corresponding stratal-fluid annular container with the corresponding stratal fluid which then flows to the layer through the corresponding porous plate; when the pressure at the layer reaches the predetermined value, the fluid replenishing constant-flow pump is turned off.

(5) Monitoring of Stratal Data

During the stratal fluid replenishing process, the replenishing amount of stratal fluid to each layer is recorded by the weighing machine, which can be used to estimate the fluid loss of each layer. Further, sand production data and deformation of the superstratum layer can help analyzing the pattern of gas-liquid-solid multiphase flow, providing experimental evidences for the study on sand prevention and stratum instability.

In addition, since currently existing natural gas hydrate experimental devices are constructed, as compared with actual formation environment, in a scale not enough to present a temperature gradient, most reactors are configured to be disposed in a constant temperature water bath. However, in actual exploitation, natural gas hydrate reservoirs are affected by the temperature of the formation, and there will be certain temperature differences and temperature gradient as the temperature changes with depth. The temperature gradient will have a certain impact on the formation and exploitation of natural gas hydrates, resulting in a higher requirement, for simulating the formation temperature gradient, on large-scale natural gas hydrate devices which operate in a situation closer to the actual exploitation. In some embodiments, a more realistic simulation of layered stratum is realized by further introducing the temperature gradient simulator, in combination with the predetermined value for turning on the constant flow valve.

Figure 3:
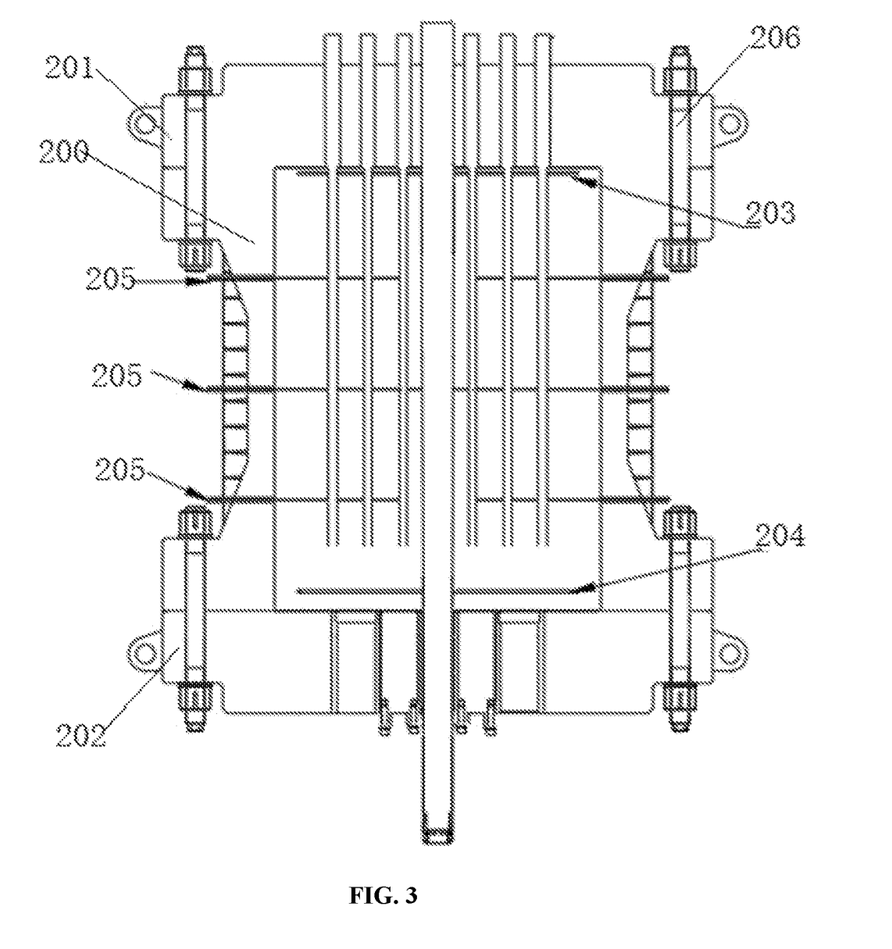
FIG. 3 shows the structure of a reactor comprising a temperature gradient simulator in one embodiment.

Accordingly, as shown in FIG. 3, the reactor comprises a reactor body 200, an upper cover 201 disposed at an upper surface of the reactor body, and a lower cover 202 disposed at a lower surface of the reactor body. The connection between the reactor body 200 and the upper and lower covers are realized by means of bolts 206, such that the connection is stable, firm, safe and reliable.

An upper circulation coil 203 and a lower circulation coil 204 are respectively disposed at an upper end and a lower end inside the reactor body 200. The upper circulation coil 203 and the lower circulation coil 204 are respectively provided with an independent heat exchange device (not shown in the drawing) to realize the circulation of the heat transfer medium in the coils. The heat exchange devices are capable of cooling, heating, and maintaining temperature. With the upper circulation coil 203 and the lower circulation coil 204, isothermal planes are formed at the upper end and the lower end inside the reactor body 200. However, with the isothermal planes formed at the upper end and the lower end inside the reactor body only, since heat insulation at the periphery of the reactor is not realized, under the influence of thermal convection, the temperature will be high throughout most of the space from bottom to top, making it impossible to form a balanced temperature gradient, and therefore failing to simulate the temperature gradient throughout the formation. Accordingly, in the present embodiment, N temperature control pipes 205 are spacedly provided inside the reactor body 200 and between the upper circulation coil 203 and the lower circulation coil 204, configured to form a vertical temperature gradient in the reactor body 200, wherein N is a positive integer and determined depending on actual requirement. In the present invention, N is 3, i.e., three temperature control pipes 205 are provided, and each temperature control pipe 205 is also provided with an independent heat exchange device to realize the circulation of the heat transfer medium in the temperature control pipe.

The configuration of providing the upper circulation coil and the lower circulation coil at the upper and lower ends inside the reactor body realizes stable heating. N temperature control pipes are spacedly provided between the upper circulation coil and the lower circulation coil and encircling the reactor body; moreover, each temperature control pipe is also provided with an independent heat exchange device to realize the circulation of the heat transfer medium in the temperature control pipe (i.e., they are also capable of cooling, heating, and maintaining temperature), such that the temperature of each temperature control pipe can be regulated independently, realizing the simulation of formation temperature gradient inside the reactor body.

In addition, since the formation temperature gradually decreases at a certain gradient from bottom to top, in order to realize a more precise simulation of formation temperature gradient, the N temperature control pipes are equally spaced from bottom to top and a constant temperature difference is given between the temperature control pipes; such configuration the arrangement of low temperature zone to high temperature zone at intervals of the same temperature difference and distance from top to bottom. Specifically, the lower circulation coil 204 is set to produce a high temperature T1, while the upper circulation coil 203 is set to produce a low temperature T2; N temperature control pipes 205 are provided, wherein the temperature difference between the temperature control pipes 205 can be expressed as $\Delta T=(T1-T2)/(N+1)$, i.e., the temperature control pipes 205 from top to bottom are respectively set to produce a temperature of $T2+\Delta T$, $T2+2\Delta T$, ..., and $T2+N\Delta T$.

Moreover, in order to maintain the temperature difference $\Delta T$ between the temperature control pipes stable in real time so as to achieve the most realistic simulation of the formation, temperature sensors are provided inside the reactor body 200, configured to monitor the temperatures of the upper circulation coil 203, the lower circulation coil 204 and the N temperature control pipes 205 and transmit the monitored temperature data to a temperature regulator. The temperature regulator regulates in real time the operation of each heat exchange device according to the monitored temperature data, so as to maintain the vertical temperature gradient in the reactor body stable. Specifically in the present embodiment, the temperature difference for the vertical temperature gradient is set to be 5° C., and the temperature control accuracy is ±0.5° C.

In some embodiments, in order to study the flow field of the layered stratum including the overlying pressure layer (which is provided when required to simulate high pressure in deep sea), the superstratum layer, the hydrate layer, and the substratum layer, a flow field measurement device is also provided. The flow field measurement device can quantify the flow field inside the reactor, providing the fluid replenishing modules with an index for replenishing fluids. During the operation inside the reactor, a plurality of vertical wells are disposed throughout each layer, including one central vertical well located at center and non-central vertical wells being the remainders; the flow field measurement device comprises non-central vertical well pressure sensors, non-central vertical well outlet valves, communicating vessel valves, differential pressure sensors, a communicating vessel, a central vertical well outlet valve, and a central vertical well pressure sensor; the non-central vertical well pressure sensors, the non-central vertical well outlet valves, the differential pressure sensors, and the communicating vessel valves are respectively provided in an amount identical to that of the non-central vertical wells; each of the non-central vertical well is provided with a non-central vertical well outlet pipeline, wherein each non-central vertical well outlet pipeline is correspondingly provided with one of the non-central vertical well pressure sensors, one of the non-central vertical well outlet valves, one of the differential pressure sensors, and one of the communicating vessel valves communicatedly in sequence, and all of the communicating vessel valves are connected with the communicating vessel; the central vertical well is provided with a central vertical well outlet pipeline, wherein the central vertical well outlet pipeline is provided with the central vertical well pressure sensor and the central vertical well outlet valve communicatedly in sequence, and the central vertical well outlet valve is connected with the communicating vessel.

Figure 4:
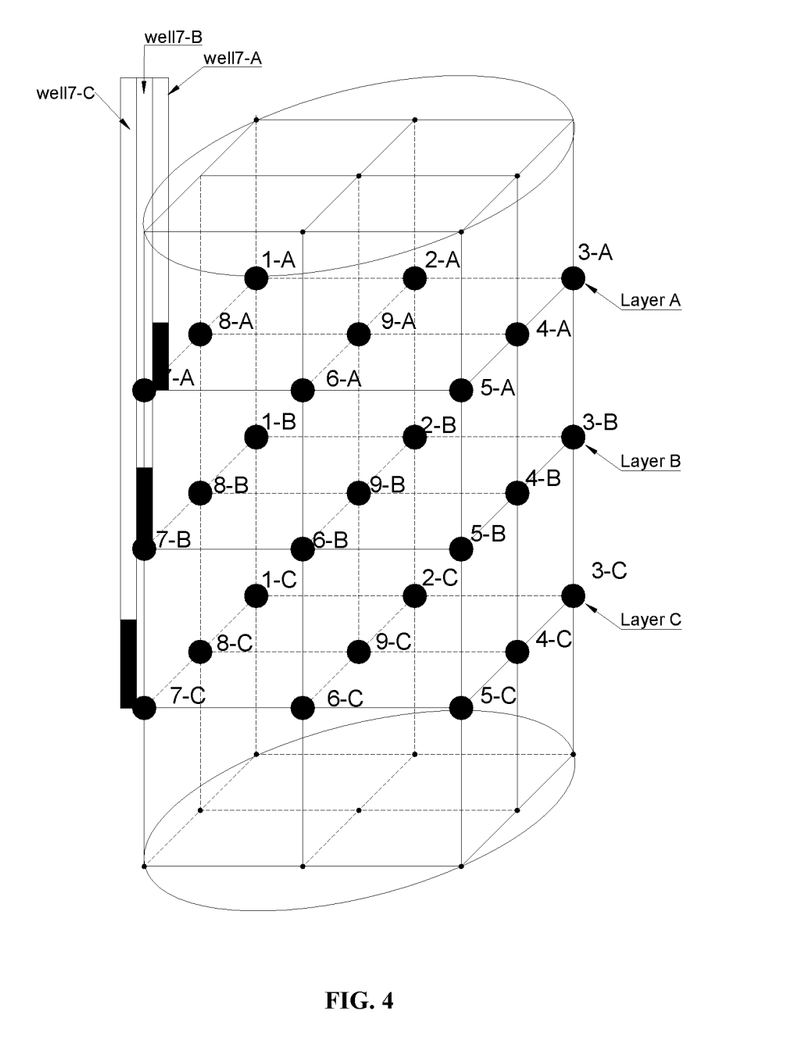
FIG. 4 shows the disposition of measuring points of a flow flied measurement device inside the reactor in one embodiment.
Figure 5:
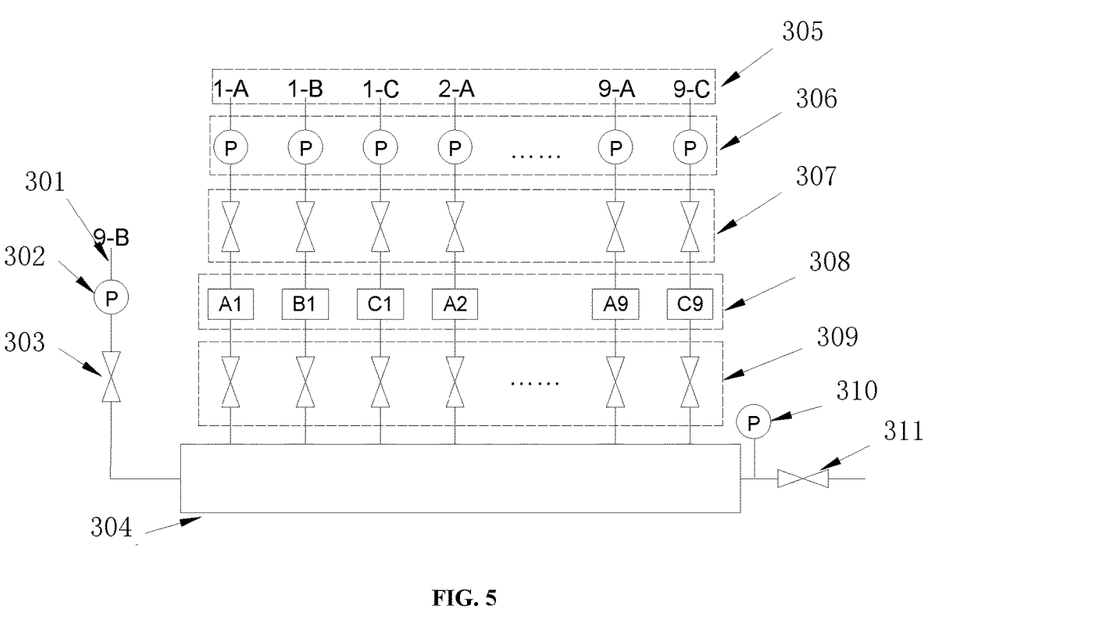
FIG. 5 shows the structure of the flow flied measurement device in one embodiment.

Reference is made to FIG. 4 that there are twenty-seven vertical wells disposed inside the reactor of the natural gas hydrate experimental system of the present embodiments, and the natural gas hydrate reservoir is divided into three layers, wherein nine vertical wells are symmetrically distributed throughout each layer. The wells are respectively numbered as 1-A, 2-A, . . . , 9-B, and 9-C, wherein the vertical well 9-B located at center is a central vertical well, while the remaining vertical wells are non-central vertical wells. As shown in FIG. 5, the flow field measurement device provided in the present embodiment mainly comprises non-central vertical well pressure sensors 306, non-central vertical well outlet valves 307, communicating vessel valves 309, differential pressure sensors 308, a communicating vessel 304, a central vertical well outlet valve 303, and a central vertical well pressure sensor 302.

The non-central vertical well pressure sensors 306, the non-central vertical well outlet valves 307, the differential pressure sensors 308, and the communicating vessel valves 309 are respectively provided in an amount identical to that of the non-central vertical wells. All non-central vertical well outlet pipelines 305, except for the vertical well 9-B, are respectively connected to a non-central vertical well pressure sensor 306, a non-central vertical well outlet valve 307, and one end of a differential pressure sensor 308 in sequence. The other end of the differential pressure sensor 308 is connected to a communicating vessel valve 309. All of the communicating vessel valves 309 are connected with the communicating vessel 304. The other end of the communicating vessel 304 is connected to the central vertical well outlet valve 303, the central vertical well pressure sensor 302, and a central vertical well outlet pipeline 301.

The twenty-six differential pressure sensors are respectively numbered as A1, B1, C1, A2, . . . , A9, and C9, representing the differential pressure sensor connecting the well 1-A and well 9-B, the differential pressure sensor connecting the well 1-B and well 9-B, . . . , the differential pressure sensor connecting the well 9-A and well 9-B, and the differential pressure sensor connecting the well 9-C and well 9-B. Specifically, the differential pressure sensors 8 have a measuring accuracy higher than that of the central vertical well pressure sensor 302 and non-central vertical well pressure sensors 306, and a measuring range lower than that of the central vertical well pressure sensor 302 and non-central vertical well pressure sensors 306. Since the pressure sensors are not applicable for low pressure differences due to their low measuring accuracy while the differential pressure sensors 308 have a higher measuring accuracy, when the pressure difference is relatively low, the pressure sensors may show the same readings while the differential pressure sensors is capable of revealing the pressure difference; when the pressure difference is relatively high and exceed the measuring range of the differential pressure sensors, the differential pressure sensors may be damaged. In summary, the differential pressure sensors have a high accuracy but a low measuring range, while the pressure sensors have a high measuring range but a low accuracy, and thus these two kinds of sensors should be used in combination.

Accordingly, when it is necessary to inspect a flow field in the reactor, the first step is recording readings of the twenty-seven pressure sensors to obtain a pressure difference between each vertical well and the central vertical well, and then comparing the obtained pressure difference with a measuring range of the differential pressure sensor; if the obtained pressure difference is higher than the measuring range of the differential pressure sensor, then the obtained pressure difference is determined to be a pressure difference between the non-central vertical well corresponding to the differential pressure sensor and the central vertical well; if the obtained pressure difference is not higher than the measuring range of the differential pressure sensor, then opening the non-central vertical well outlet valve and the communicating vessel valve which are connected to the differential pressure sensor, and measuring the pressure difference between the corresponding non-central vertical well and the central vertical well using the differential pressure sensor. Driven by the pressure differences, gas and liquid will flow spontaneously from a high pressure zone to a low pressure zone (or tend to flow spontaneously from the high pressure zone to the low pressure zone), in other words, the accurate measurement of flow field in the reactor is realized.

In view of the above, with the flow field measurement device, the flow field inside the reactor is quantified according to the pressure differences between the points, accurately and effectively. Providing differential pressure sensors, between a measuring point of the central vertical well and a measuring point of each of the non-central vertical wells, to measure the pressure differences, enables reasonable distribution of three-dimensional space inside the entire reactor, making it easier to analyze the gas-liquid flow trends in the reactor with the simulated flow field. The step of determining whether to turn on the differential pressure sensors according to a predetermination based on the feedback from the pressure sensors, allows flow field measurements in the reactor under both high and low pressure differences and effective protection of the differential pressure sensors. Meanwhile, since communication of the entire measurement device is realized by the vertical well outlet pipelines, the measurement device can be externally connected to the reactor, in other words, the differential pressure sensors and the communicating vessel can be disposed outside the reactor. Thus, it is not necessary to conduct significant modifications to the entire gas hydrate system, and no damage will be done to the experimental devices; for a natural gas hydrate experimental system without flow field measurement function, it is possible to introduce the present device whenever it is required. Combination of the flow field measurement device and the fluid replenishing modules can realize better analysis of each layer.

Depending on the needs, the exploitation method can be selected from the depressurization method and the thermal stimulation method, wherein the depressurization method is one of the currently major methods for hydrate exploitation, which involves a dissociation process of hydrate solids to produce methane gas, caused by reducing the pressure on the gas hydrate layer to lower than the phase equilibrium pressure of hydrate under the local temperature. Design of exploitation wells for the depressurization method is similar to those for conventional exploitation of oil and gas; the pressure spreads quickly in the hydrate reservoir with higher permeability, and thus the depressurization method is the most potential method which is economical and effective. The thermal stimulation method refers to a process of heating the gas hydrate layer to raise its temperature to above the equilibrium temperature, which causes the gas hydrate to dissociate into water and natural gas.

The above-mentioned embodiments are only intended to illustrate the technical concept and characteristics of the present invention, enabling those of ordinary skill in the art to understand the content of the present invention and implement them accordingly, but are not intended to limit the scope of the present invention. All equivalent changes or modifications made according to the essence of the present invention should fall within the scope of the present invention.

What is claimed is:

1. A device for simulating a layered stratum containing natural gas hydrates, comprising a reactor, wherein
    the reactor comprises an upper cover, a lower cover, and a reactor body, wherein the upper cover and the lower cover are sealably attached to two ends of the reactor body to form a closed chamber;
    a temperature gradient simulator is disposed inside the reactor;
    an overlying pressure layer, a superstratum layer, a hydrate layer and a substratum layer are sequentially formed throughout an inside of the closed chamber from the upper cover to the lower cover, wherein each layer of the overlying pressure layer, the superstratum layer, the hydrate layer and the substratum layer is respectively filled with different kinds of porous media and fluids and the each layer is provided with a stratal-fluid annular container;
    the stratal-fluid annular container of the each layer has an outer periphery contacting an inner surface of the reactor body, and an inner periphery contacting the porous media and the fluids of the each layer through a porous plate;
    the stratal-fluid annular container of the each layer is communicated with a fluid replenishing module respectively, wherein the stratal-fluid annular container of the overlying pressure layer is communicated with an overlying pressure layer fluid replenishing module, the stratal-fluid annular container of the superstratum layer is communicated with a superstratum layer fluid replenishing module, the stratal-fluid annular container of the hydrate layer is communicated with a hydrate layer fluid replenishing module, and the stratal-fluid annular container of the substratum layer is communicated with a substratum layer fluid replenishing module;
    the reactor is provided with a gas inlet for introducing a methane gas into the closed chamber and a fluid inlet for introducing a fluid into the closed chamber; and
    a central exploitation wellbore penetrating a center of the reactor is disposed from the upper cover to the lower cover.

2. The device according to claim 1, wherein
    each fluid replenishing module comprises a replenishing stratal fluid container, a fluid replenishing constant-flow pump, and a pipeline pressure sensor, wherein the replenishing stratal fluid container is communicated with the stratal-fluid annular container of the each layer through a pipeline provided with a detachable joint and a stratal fluid replenishing valve; and
    the pipeline pressure sensor is configured to turn on the fluid replenishing constant-flow pump when a pressure inside the stratal-fluid annular container of the each layer is lower than a predetermined value, and turn off the fluid replenishing constant-flow pump when the pressure inside the stratal-fluid annular container of the each layer reaches the predetermined value.

3. The device according to claim 2, wherein a scale is provided inside the reactor along a height direction of the reactor, and the scale is configured to measure a thickness of the each layer.

4. The device according to claim 1, wherein the replenishing stratal fluid container of the each fluid replenishing module is filled with a stratal fluid, provided with a cover, and placed on a weighing machine.

5. The device according to claim 4, wherein a scale is provided inside the reactor along a height direction of the reactor, and the scale is configured to measure a thickness of the each layer.

6. The device according to claim 1, wherein a scale is provided inside the reactor along a height direction of the reactor, and the scale is configured to measure a thickness of the each layer.

7. The device according to claim 1, wherein
the temperature gradient simulator comprises an upper circulation coil and a lower circulation coil; wherein
the upper circulation coil and the lower circulation coil are respectively disposed at an upper end and a lower end inside the reactor body;
the upper circulation coil and the lower circulation coil are respectively provided with an independent heat exchange device to realize a circulation of a heat transfer medium in the upper circulation coil and the lower circulation coil;
N temperature control pipes are spacedly provided inside the reactor body and between the upper circulation coil and the lower circulation coil, and configured to form a vertical temperature gradient in the reactor body, wherein N is a positive integer;
each of the N temperature control pipes is also provided with an independent heat exchange device to realize a circulation of a heat transfer medium in the each of the N temperature control pipes.

8. The device according to claim 7, wherein
the N temperature control pipes are equally spaced from bottom to top and a constant temperature difference is given between the N temperature control pipes, wherein the constant temperature difference is expressed as:
$\Delta T=(T1-T2)/(N+1)$, wherein T2 represents a temperature of the lower circulation coil, and T1 represents a temperature of the upper circulation coil.

9. The device according to claim 8, wherein
temperature sensors are provided inside the reactor body and configured to monitor the temperature of the upper circulation coil, the temperature of the lower circulation coil and temperatures of the N temperature control pipes and transmit monitored temperature data to a regulator; and
the regulator is configured to regulate an operation of the first heat exchange device and an operation of the second heat exchange device according to the monitored temperature data in real time to maintain the vertical temperature gradient in the reactor body stable.

10. A method for simulating a layered stratum containing natural gas hydrates by using the device according to claim 1, comprising the following steps:
filling the reactor with the porous media and introducing the methane gas and the fluids into the rector according to required compositions of the superstratum layer, the hydrate layer and the substratum layer, reserving a space for the overlying pressure layer, and then sealing the reactor;
checking a gas tightness of the reactor;
reducing a temperature inside the reactor to a simulated stratal temperature;
setting a predetermined value for turning on a fluid replenishing constant-flow pump, wherein the predetermined value for the overlying pressure layer is set to a value simulating an overlying pressure at seafloor;
monitoring a pressure inside the reactor; when the pressure inside the reactor is stable, conducting a simulation of a natural gas hydrate exploitation process, wherein during the simulation, a water-gas-sand mixture is continuously produced from the central exploitation wellbore and a pressure at the each layer in the reactor reduces;
when the pressure at a layer of the each layer is lower than the predetermined value, turning on the fluid replenishing constant-flow pump to replenish the stratal-fluid annular container with a stratal fluid, wherein the stratal fluid flows to the layer through the porous plate, and when the pressure at the layer reaches the predetermined value, turning off the fluid replenishing constant-flow pump;
recording a mass change of the stratal fluid during the simulation to obtain a replenishing amount of the stratal fluid.

* * * * *